Feb. 22, 1966  C. R. TAYLOR ETAL  3,235,940

PAPER SHEET-FEED ROLLER

Filed Jan. 10, 1964

CLARENCE R. TAYLOR
ROY H. HARNISCHFEGER
WILLIAM C. WILSON
INVENTORS.

BY R. Frank Smith
Steve W. Grembow
ATTORNEYS

3,235,940
PAPER SHEET-FEED ROLLER

Clarence R. Taylor, Penfield, and Roy H. Harnischfeger and William C. Wilson, Rochester, N.Y., assignors to Eastman Kodak Company, Rochester, N.Y., a corporation of New Jersey
Filed Jan. 10, 1964, Ser. No. 336,945
6 Claims. (Cl. 29—125)

This invention relates generally to transport mechanisms, and more specifically to an improved paper sheet-feed roller.

It is generally old in the art to provide a paper sheet-feeding mechanism having a driven sheet-feet roller that is movable into engagement with a stack of sheets. In such sheet-feeding mechanisms, the sheet-feed roller normally comprises a relatively dense rubber tire mounted on a suitable shaft. Although rubber sheet-feed rollers of this type may operate satisfactorily, one serious drawback to them is their short life span. The reasons for the short life span appear to be (1) the surface of the rubber becomes glazed with use resulting in a rapid falling off in the ability of the roller to positively feed sheets; and (2) the rubber wears rapidly and forms flat spots on the roller which interferes with the ability of the roller to positively feed sheets. Applicants' improved paper sheet-feed roller effectively overcomes the deficiencies of glazing and wear to provide a paper sheet-feed roller having long life characteristics.

One of the objects of the present invention is to provide a paper sheet-feed roller including an improved tire assembly that retains excellent sheet-feeding ability even after many hours of use and wear.

Another object of the invention is to provide a paper sheet-feed roller including an improved tire assembly having an exceptionally long life span.

Another object of the invention is to provide a paper sheet-feed roller including an improved tire assembly that eliminates the glazing deficiency normally prevalent in relatively dense rubber tires.

Another object of the invention is to provide a paper sheet-feed roller including an improved tire assembly made of a urethane polyether foam plastic material.

Objects and advantages other than those set forth above will be apparent from the following description when read in connection with the accompanying drawing, in which.

Figure 2:
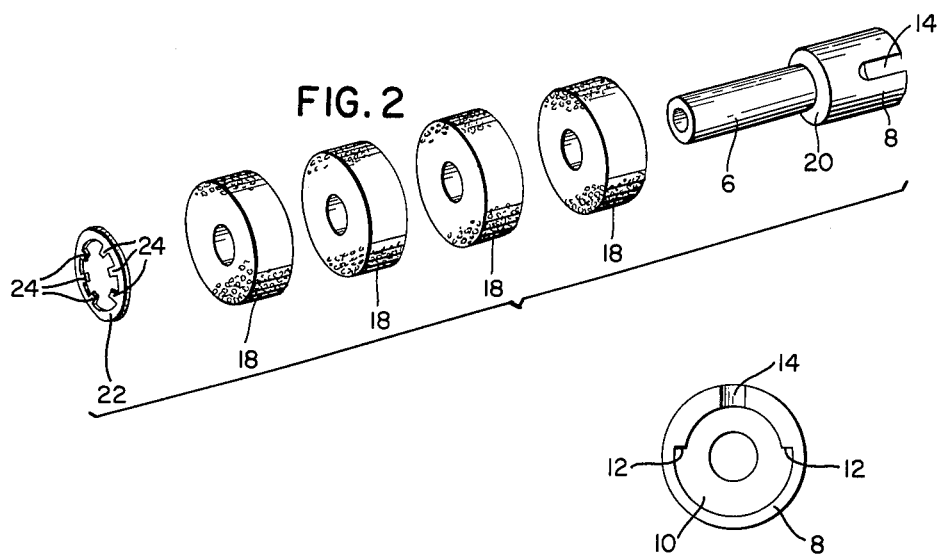
FIG. 2 is a reduced exploded view of the sheet-feed roller of FIG. 1.
Figure 3:
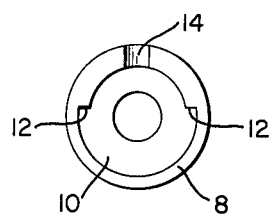
FIG. 3 is an enlarged end view of the sheet-feed roller of FIG. 1.

Referring to the drawing, a preferred embodiment of a paper sheet-feed roller 5 is disclosed therein comprising a shaft 6 having a coupling 8 at one end for drivingly connecting the shaft 6 to any suitable drive means, not shown. The coupling 8 (see FIG. 3) has a bore 10 for receiving a portion of the drive means, and a pair of shoulders 12 and an axial slot 14 for cooperation therewith. A tire assembly 16, preferably comprising a plurality of annular sections 18 (see FIG. 2) of a flexible foamed plastic in cellular form, such as urethane foam, is mounted on shaft 6 with one side of a section 18 abutting an annular shoulder 20 at one end of coupling 8. A urethane foam believed to work exceptionally well is a reaction product of a polyether and polyisocyanate, commonly referred to as a polyether foam. The polyether foam is commercially available, and the typical properties of such a foam may be found in the Modern Plastics Encyclopedia for 1964, September 1963, vol. 41, No. 1A. The sections 18 of polyether foam are compressed on shaft 6 and retained in the compressed state by a retaining washer 22. The retaining washer 22 is a well-known type having a plurality of radially extending fingers 24 co-operating with shaft 6 to prevent axial removal of retainer 22. Compressing the sections of polyether foam locks the sections together to prevent slippage of the same on shaft 6, and also increases the surface density and hardness of the tire assembly 16. The increased density and hardness is necessary in order to provide good paper feeding characteristics. It has been found that compressing the foam to approximately one third of its original length has resulted in increasing its density and hardness the desired amount. It is noted that when the polyether foam is not compressed, it wears out much faster and does not appear to have the frictional requirements for proper sheet feeding.

Figure 1:
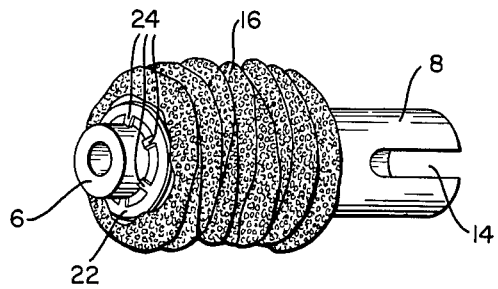
FIG. 1 is a perspective view of a sheet-feed roller constructed in accordance with one embodiment of this invention.

Although applicants have used a plurality of sections 18 of polyether foam, the invention is believed to be equally effective when only a single section is used. One additional advantage of using a plurality of sections, is that the outside peripheries of the sections 18, due to their softness, do not align themselves exactly when compressed as seen in FIG. 1 so that the outer periphery of the tire assembly as a whole presents a relatively irregular surface. This tends to minimize the tendency of the tire assembly to become glazed thereby interfering with the paper-feeding ability of the tire assembly.

Figure 4:
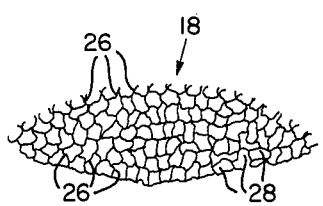
FIG. 4 is an enlarged view of a peripheral portion of one of the segments of the roller of FIG. 2.

The polyether foam is of cellulor construction having a plurality of interconnecting cell walls 26 with air spaces 28 therebetween as seen exaggerated in FIG. 4. One advantage of the cellular structure is that it supplements the irregular surface of the tire assembly 16 in minimizing the tendency of its surface to become glazed from use. This is primarily due to the large number of air spaces 28 along the surface of the tire assembly in engagement with any sheet to be fed. These air spaces are sufficiently large and numerous so that it is impossible to fill them with foreign material during normal sheet feeding use and hence cause glazing. Also, as the cellular wall material 26 wears off, new air spaces 28 are exposed so that the tire assembly surface engaging the sheets remains essentially the same no matter how much of the cellular wall material 26 wears off. Since polyether foam is extremely soft; in fact too soft for paper feeding in its normal state, applicants have discovered that compressing the foam imparts the necessary surface density and hardness that is required for effective paper feeding.

The invention has been described in detail with particular reference to a preferred embodiment thereof, but it will be understood that variations and modifications can be effected within the spirit and scope of the invention as described hereinabove and as defined in the appended claims.

We claim:

1. In a paper sheet-feed roller, the combination comprising:
   a shaft;
   an annular section of flexible urethane foam of a predetermined axial length mounted on said shaft; and
   means for maintaining said foam on said shaft in a compressed state in which its axial length is approximately one-third of said predetermined length.

2. The invention according to claim 1 wherein said urethane foam is a polyether foam.

3. The invention according to claim 1 wherein a plurality of annular sections of urethane foam are mounted on said shaft.

4. In a paper sheet-feed roller adapted to be rotatably driven by a suitable drive means, the combination comprising:
a shaft having a portion of one diameter and a drive coupling at one end of larger diameter, and an anniular surface connecting the portion of the coupling;
an annular section of flexible urethane foam of a predetermined axial length mounted on said portion with one end thereof abutting said annular surface, and retaining means on said portion engaging said other end of said foam and cooperating with said surface for maintaining said foam on said shaft in a compressed state in which its axial length is approximately one-third of said predetermined length.

5. The invention according to claim 4 wherein said urethane foam is a polyether foam.

6. The invention according to claim 4 wherein a plurality of sections of urethane foam are mounted on said shaft.

References Cited by the Examiner

UNITED STATES PATENTS

| 616,184 | 12/1898 | Demmler | 15—230.19 |
| 2,903,731 | 9/1959 | Huhtala | 15—230.11 |
| 3,062,534 | 11/1962 | Benson et al. | 271—36 |
| 3,067,444 | 12/1962 | Dickson et al. | 29—121 X |

FOREIGN PATENTS

| 803,418 | 10/1958 | Great Britain. |

OTHER REFERENCES

"Modern Plastics," Encyclopedia issue for 1964, September 1963, p. 348, vol. 41, No. 1A (TP 986, a 2 MS).

WALTER A. SCHEEL, *Primary Examiner.*

LOUIS O. MASSEL, *Examiner.*